(12) United States Patent
Scheid et al.

(10) Patent No.: US 11,975,863 B2
(45) Date of Patent: May 7, 2024

(54) GAS TURBINE ENGINE COMMUNICATION DATA MANAGEMENT FUNCTION COMMUNICATING VIA AIRCRAFT WIRELESS GATEWAY

(71) Applicant: Raytheon Technologies Corporation, Farmington, CT (US)

(72) Inventors: Paul Raymond Scheid, West Hartford, CT (US); Jason E. Posniak, Broad Brook, CT (US)

(73) Assignee: RTX CORPORATION, Farmington, CT (US)

( * ) Notice: Subject to any disclaimer, the term of this patent is extended or adjusted under 35 U.S.C. 154(b) by 330 days.

(21) Appl. No.: 17/245,425

(22) Filed: Apr. 30, 2021

(65) Prior Publication Data
US 2022/0348351 A1 Nov. 3, 2022

(51) Int. Cl.
*B64D 45/00* (2006.01)
*B64D 43/00* (2006.01)
*G08G 5/00* (2006.01)

(52) U.S. Cl.
CPC ............. *B64D 45/00* (2013.01); *B64D 43/00* (2013.01); *G08G 5/0013* (2013.01); *G08G 5/003* (2013.01); *B64D 2045/0085* (2013.01)

(58) Field of Classification Search
CPC ...... G08G 5/003; G08G 5/0013; G08G 5/006; G08G 5/0069; G08G 5/0026; G08G 5/0034; G08G 5/0043; G08G 5/0082; B64C 39/024; B64U 70/00; B64U 10/13; B64U 2201/00; H04B 7/18506
See application file for complete search history.

(56) References Cited

U.S. PATENT DOCUMENTS

| | | | |
|---|---|---|---|
| 6,943,699 B2 | 9/2005 | Ziarno | |
| 7,844,385 B2 | 11/2010 | Loda et al. | |
| 9,152,146 B2 | 10/2015 | Ziarno | |
| 10,470,114 B2 | 11/2019 | Lee et al. | |
| 10,529,150 B2 | 1/2020 | Scholten et al. | |
| 10,819,601 B2 | 10/2020 | Scholten et al. | |
| 2017/0295031 A1* | 10/2017 | Bush | H04L 63/1433 |
| 2020/0294401 A1 | 9/2020 | Kerecsen | |

FOREIGN PATENT DOCUMENTS

| | | |
|---|---|---|
| EP | 3694115 A1 | 8/2020 |
| EP | 3798994 A1 | 3/2021 |

OTHER PUBLICATIONS

Airinformatics ("e-Enabled Aircraft Wireless Site Survey", [online] Retrieved May 15, 2023 URL>https://web.archive.org/web/20160730132448/https://www.airinformatics.com/AC_Wireless_Survey.html dated Jun. 30, 2016) (Year: 2016).*
European Search Report Issued in European Application No. 22171021.3-1213 dated Sep. 23, 2022; 8 Pages.

* cited by examiner

*Primary Examiner* — Shon G Foley
(74) *Attorney, Agent, or Firm* — CANTOR COLBURN LLP (57) ABSTRACT

Examples described herein provide a method that includes receiving engine data from a sensor associated with the engine. The method further includes associating a header with the engine data to generate packaged engine data. The method further includes transmitting the packaged engine data to an aircraft communication unit, wherein the header provides for the aircraft communication unit to transmit the packaged engine data to a ground station communication unit via a communication protocol.

20 Claims, 5 Drawing Sheets

GAS TURBINE ENGINE COMMUNICATION DATA MANAGEMENT FUNCTION COMMUNICATING VIA AIRCRAFT WIRELESS GATEWAY

BACKGROUND

The subject matter disclosed herein generally relates to gas turbine engine communication systems and, more particularly, to a gas turbine engine communication data management function communicating via aircraft wireless gateway.

A control system of a gas turbine engine uses multiple configuration control items, such as control software, engine bill of materials (BOM) configuration data, trim updatable values, and the like to control the operation of the gas turbine engine and monitor the performance of the gas turbine engine. Once a gas turbine engine is deployed in the field, it can be difficult to access data captured and/or computed by the control system and to make updates to the configuration control items. A gas turbine engine can be deployed in the field for extended service life, such as a period of decades. Computer system technology and communication technology can evolve at a rapid pace adding to the challenges of interfacing with offboard systems as the offboard technology continues to advance during the lifespan of the engine.

BRIEF DESCRIPTION

According to an embodiment, a method includes receiving engine data from a sensor associated with the engine. The method further includes associating a header with the engine data to generate packaged engine data. The method further includes transmitting the packaged engine data to an aircraft communication unit, wherein the header provides for the aircraft communication unit to transmit the packaged engine data to a ground station communication unit via a communication protocol.

In addition to one or more of the features described above or below, or as an alternative, further embodiments may include that the header includes a source system identifier, a delivery destination identifier, and a report identifier.

In addition to one or more of the features described above or below, or as an alternative, further embodiments may include that the report identifier defines a type of report to which the engine data relates.

In addition to one or more of the features described above or below, or as an alternative, further embodiments may include that the type of report is based on a segment of a flight plan.

In addition to one or more of the features described above or below, or as an alternative, further embodiments may include that the aircraft communication unit is a terminal wireless local area network (LAN) unit (TWLU), and that the ground station communication unit is a ground station wireless terminal.

In addition to one or more of the features described above or below, or as an alternative, further embodiments may include that the communication protocol is a cellular communication protocol.

In addition to one or more of the features described above or below, or as an alternative, further embodiments may include that the communication protocol is a WiFi communication protocol.

In addition to one or more of the features described above or below, or as an alternative, further embodiments may include that the communication protocol is a satellite communication protocol.

In addition to one or more of the features described above or below, or as an alternative, further embodiments may include that the header provides for the ground station communication unit to transmit the packaged engine data to a delivery destination system.

According to an embodiment, a gas turbine engine includes a fan section comprising a fan case and an engine control mounted on the fan case, the engine control configured to monitor and control operation of the gas turbine engine in real-time. The engine control includes processing circuitry. The processing circuitry receives engine data about the gas turbine engine from a sensor associated with the gas turbine engine. The processing circuitry associates a header with the engine data to generate packaged engine data. The processing circuitry transmits the packaged engine data to an aircraft communication unit, wherein the header provides for the aircraft communication unit to transmit the packaged engine data to a ground station communication unit via a communication protocol.

In addition to one or more of the features described above or below, or as an alternative, further embodiments may include that the header includes a source system identifier, a delivery destination identifier, and a report identifier.

In addition to one or more of the features described above or below, or as an alternative, further embodiments may include that the report identifier defines a type of report to which the engine data relates.

In addition to one or more of the features described above or below, or as an alternative, further embodiments may include that the type of report is based on a segment of a flight plan.

In addition to one or more of the features described above or below, or as an alternative, further embodiments may include that the communication protocol is a cellular communication protocol.

In addition to one or more of the features described above or below, or as an alternative, further embodiments may include that the communication protocol is a WiFi communication protocol.

In addition to one or more of the features described above or below, or as an alternative, further embodiments may include that the communication protocol is a satellite communication protocol.

In addition to one or more of the features described above or below, or as an alternative, further embodiments may include that the header provides for the ground station communication unit to transmit the packaged engine data to a delivery destination system.

According to an embodiment, an aircraft includes a gas turbine engine and a communication unit. The gas turbine engine includes a fan section comprising a fan case and an engine control mounted on the fan case, the engine control configured to monitor and control operation of the gas turbine engine in real-time. The engine control includes first processing circuitry. The first processing circuitry receives engine data about the gas turbine engine from a sensor associated with the gas turbine engine and associates a header with the engine data to generate packaged engine data. The communication unit includes second processing circuitry. The second processing circuitry receives the packaged engine data from the engine control and transmits the packaged engine data to a ground station communication unit via a communication protocol based at least in part on the header.

In addition to one or more of the features described above or below, or as an alternative, further embodiments may include that the header includes a source system identifier, a delivery destination identifier, and a report identifier, that the report identifier defines a type of report to which the engine data relates, and that the type of report is based on a segment of a flight plan.

In addition to one or more of the features described above or below, or as an alternative, further embodiments may include that the communication protocol is one of a cellular communication protocol, a WiFi communication protocol, or a satellite communication protocol.

A technical effect of one or more of these embodiments is achieved by incorporating communication features to securely interface an engine control system with offboard systems as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus, system, and method are presented herein by way of exemplification and not limitation with reference to the Figures.

Figure 1:
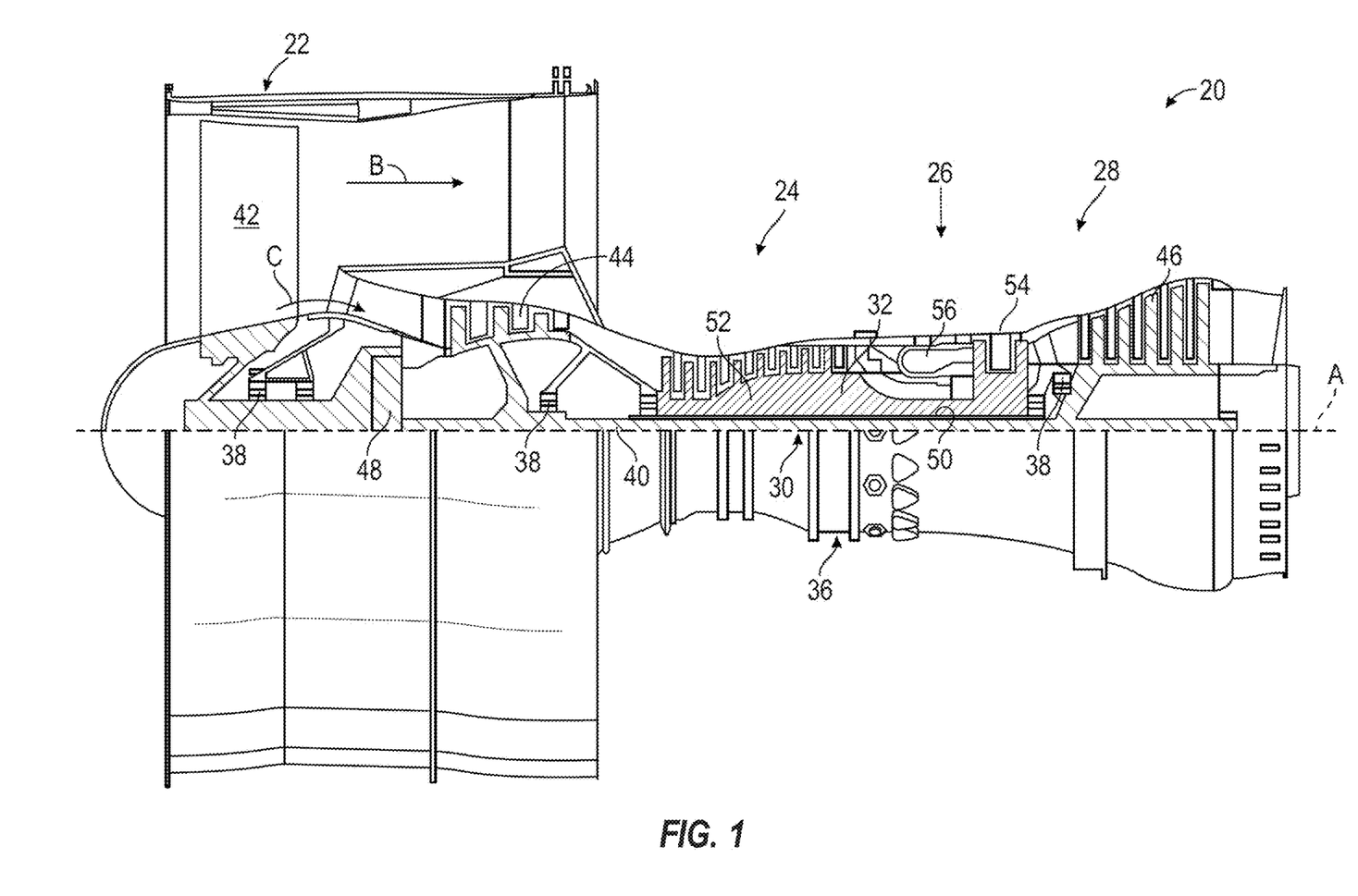
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{ R})/(518.7° \text{ R})]0.5$. The "Low corrected fan tip speed" as disclosed herein according to one non-limiting embodiment is less than about 1150 ft/second (350.5 m/sec).

Figure 2A:
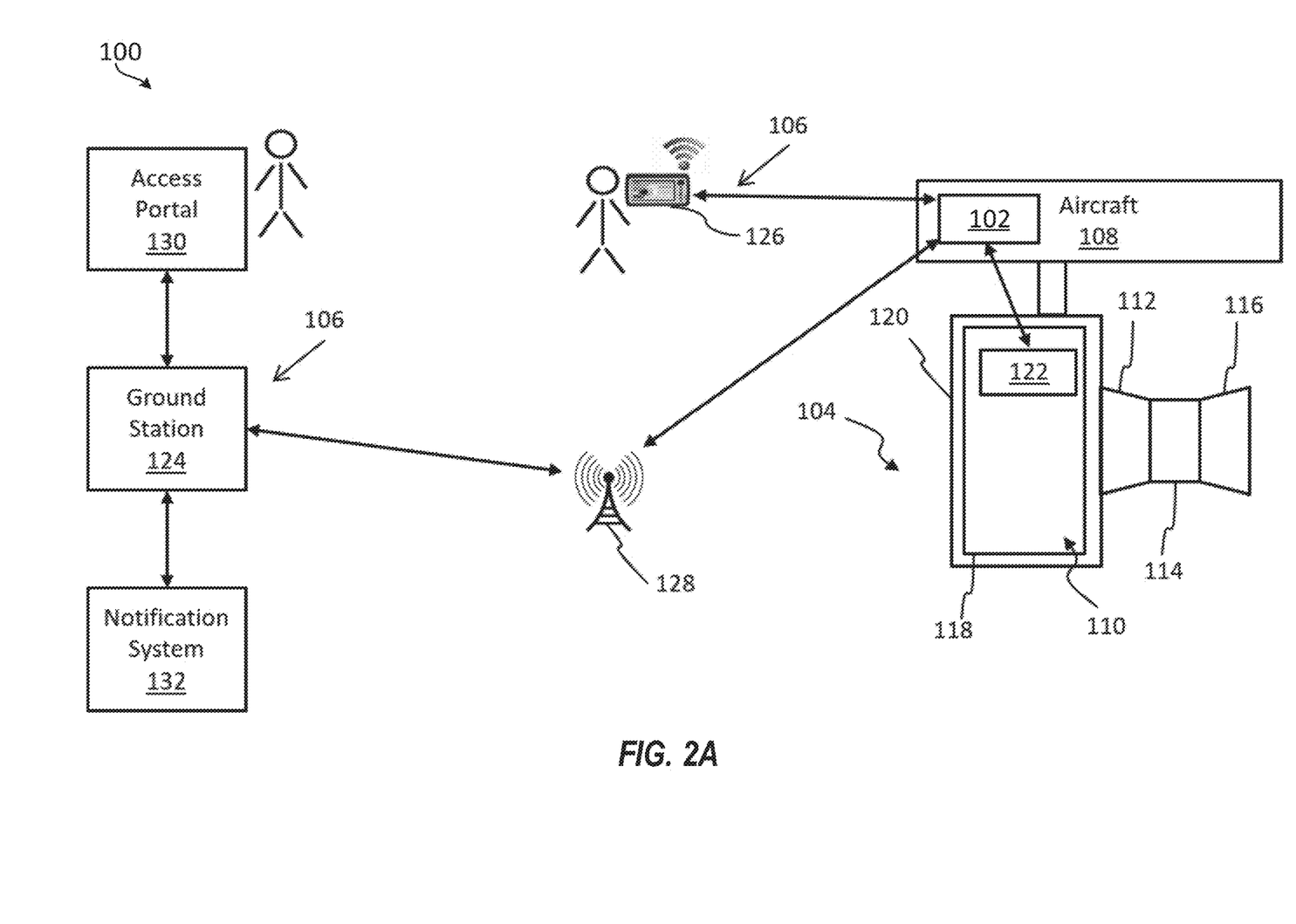
FIG. 2A is a block diagram of a system supporting wireless communication between an engine and offboard systems according to one or more embodiments described herein.

Referring now to the drawings, FIG. 2A illustrates a system 100 supporting wireless communication between a communication unit 102 (i.e., an aircraft wireless gateway) of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and communication into the combustor section 114 then expansion through the turbine section 116. A fan case 118 of the fan section 110 can be covered by a cowling 120 and may provide an installation surface that is cooler than other sections 112-116 of the gas turbine engine 104.

An engine control 122 can be mounted on the fan case 118 and covered by the cowling 120. The engine control 122 is configured to monitor and control the operation of the gas turbine engine 104 in real-time. To transfer configuration items, such as programs and data to and from the engine control 122, contemporary systems typically require that the cowling 120 is opened and multiple cables of bundled wires are coupled to the engine control 122. Such a process can ensure deliberate actions are taken in extracting data and performing updates to the engine control 122; however, the process can be slow and require large lengths of customized cables. In embodiments, the communication unit 102, also referred to as an aircraft wireless gateway and/or an aircraft terminal wireless local area network (LAN) unit (TWLU). The communication unit 102 provides for communication between the aircraft 108 and the ground station 124, also referred to as a ground station TWLU or ground station wireless terminal. Particularly, the communication unit 102 provides for engine data about the gas turbine engine 104 to be sent from the engine control 122 to the ground station 124; the communication unit 102 also provides for data (e.g., a software update) to be sent from the ground station 124 to the engine control 122. Similar to the engine control 122, the communication unit 102 can be mounted on the fan case 118 and covered by the cowling 120 of the gas turbine engine 104. The communication unit 102 performs data management functions, such as receiving engine data from the engine control 122, packaging the data for retransmission by associating the engine data with a unique identifier (i.e., a header), and transmitting the data to the ground station 124 via the aircraft communication unit 102 using the header. Wireless communication can alleviate the need for customized cables or physically opening the cowling 120 to establish communication with the offboard systems 106.

In examples, the engine data includes full flight data, fault data, event reports, etc. Data can also be uploaded to the engine control 122, for example, to load software, trims, configuration information to support upgrades of the gas turbine engine 104 (and/or its sub-systems/components).

The offboard systems 106 can include, for example, a ground station 124 (e.g., a ground station TWLU), a near-wing maintenance computer 126, an access portal 130, and/or other devices (not depicted) that may establish one-way or two-way wireless communication with the communication unit 102. For example, a global positioning system (GPS) can provide one-way wireless signaling to the communication unit 102 to assist in confirming a geographic location of the gas turbine engine 104 while the communication unit 102 is coupled to the gas turbine engine 104. Wireless communication performed by the communication unit 102 can be through a variety of technologies with different ranges supported. As one example, the aircraft TWLU can support Wi-Fi (e.g., radio wireless local area networking based on IEEE 802.11 or other applicable standards), GPS, cellular networks, satellite communication, and/or other wireless communication technologies known in the art. Wireless communication between the aircraft communication unit 102 and the offboard systems 106 can be direct or indirect. For instance, wireless communication between the communication unit 102 and ground station 124 may pass through one or more network interface components 128, such as a repeater, while wireless communication between the communication unit 102 and the near-wing maintenance computer 126 may be direct wireless communication without any router components.

The ground station 124 can provide for communication with a variety of support systems, such as an access portal 130 that provides for authorized users to access data, initiate tests, configure software, and perform other actions with respect to the engine control 122, where the communication unit 102 acts as a secure gateway to limit access and interactions with the engine control 122. As another example, the ground station 124 can communicate with a notification system 132, which may trigger alerts, text messages, e-mails, and the like to authorized recipients regarding the operational status of the gas turbine engine 104. The near-wing maintenance computer 126 may provide an authorized user with limited authority a capability to query the engine control 122 for fault data, test parameters, and other such information. In some embodiments, the near-wing maintenance computer 126 can be authorized with limited authority to make updates to select configuration parameters or data collection parameters of the engine control 122.

Figure 2B:
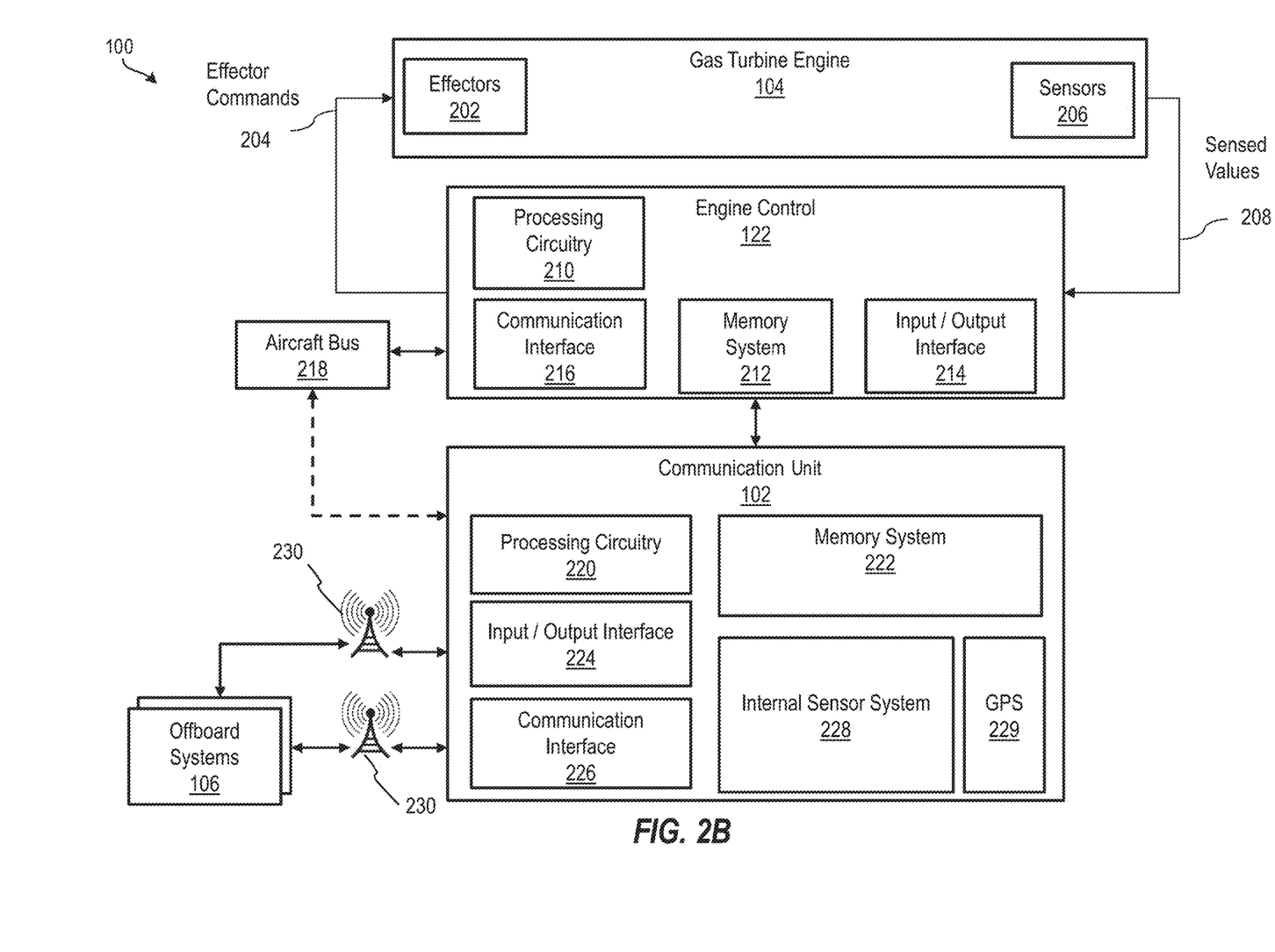
FIG. 2B is a block diagram illustrating further details of the system of FIG. 2A according to one or more embodiments described herein.

FIG. 2B is a block diagram illustrating further details of the system 100 of FIG. 2A, in accordance with an embodiment of the disclosure. The engine control 122 can control effectors 202 of the gas turbine engine 104 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 104 and provide sensed values 208 as feedback to the engine control 122 to provide for closed-loop control of the gas turbine engine 104 according to one or more control laws. Examples of the sensors 206 can include one or more temperature sensors, pressure sensors, strain gauges, speed sensors, accelerometers, lube sensors, and the like.

The engine control 122 can be a full authority digital engine control that includes processing circuitry 210 and a memory system 212 configured to store a plurality of configuration items, where at least one of the configuration items includes a sequence of the computer executable instructions for execution by the processing circuitry 210. Other types of configuration items can include data, such as trim constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements (not depicted). The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the communication unit 102. The communication interface 216 may also communicate with an aircraft bus 218 of the aircraft 108 of FIG. 2A. The aircraft bus 218 may provide aircraft-level parameters and commands that are used by the engine control 122 to control the gas turbine engine 104 in real-time.

The engine control 122 implements data management functionality, such as receiving engine data from one or more sensors associated with the gas turbine engine 104, packaging the engine data into packaged engine data by associating a header with engine data, encrypting the data to secure the data, and providing for the packaged data to be transmitted to the communication unit 102. According to one or more embodiments, the communication unit 102 acts as a gateway to route data between the engine control 122 and the offboard systems 106. In such an embodiment, the engine control 122 connects to the offboard systems 106 and the communication unit 102 handles the data transfer between the engine control 122 and the offboard systems 106. In one or more other embodiments, the communication unit 102 acts as a relay. In such an example, the communication unit 102 receives the data from one of the communication unit 102 or the ground systems 106 and transfers it to the other of the ground systems 106 or the communication unit 102.

Similar to the engine control 122, the communication unit 102 (i.e., an aircraft TWLU) can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 222 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form. According to one or more embodiments described herein, the communication unit 102 can also include an internal sensor system 228. The internal sensor system 228 can include, for example, one or more accelerometers, gyroscopes, barometers, a magnetometer (e.g., a compass), and other such sensors. Further, the communication unit 102 can include other devices, such as a GPS 229. The input/output interface 224 can process data collected from the internal sensor system 228 and condition the data in a format usable by the processing circuitry 220. The communication interface 226 can interface with one or more antennas 230, which may be integrated with the communication unit 102 or located remotely from the communication unit 102, e.g., a shark-fin antenna mounted on the aircraft fuselage or an antenna in the aircraft or under the engine cowling 120 of FIG. 2A.

The communication unit 102 can act as a communication router between the engine control 122 and the offboard systems 106. For example, after the engine control 122 is connected to the offboard systems 106, the offboard systems 106 can request to load new/updated configuration items to the memory system 212 of the engine control 122 through the communication unit 102. The communication interface 216 of the engine control 122 can interface to the communication interface 226 of the communication unit 102 through a wired, wireless, optical, or magnetic coupling. The communication interface 226 can communicate wirelessly through one or more antennas 230 to the offboard systems 106 (e.g., the ground station TWLU). The communication interface 226 may also have access to receive data directly from the aircraft bus 218 in some embodiments. In alternate embodiments, the communication unit 102 can route engine data (e.g., the sensed values 208) from the engine control 122 to the offboard systems 106 to make the engine data available remotely from the aircraft 108 (e.g., to an airline, to an engine original equipment manufacturer, to an airframer, etc.). According to one or more embodiments described herein, the communication interface 216 and the communication interface 226 communicate using a trivial file transfer protocol (TFTP), although other suitable protocols can be used.

According to one or more embodiments described herein, the communication unit 102 is used to form a wireless local area network (LAN) connection between an aircraft LAN associated with the aircraft 108 and a ground-based LAN associated with the offboard systems 106. The communication unit 102 bridges these two LANs using, for example, ground based wireless standards such as the IEEE 802.11 family of standards and cellular communication as well as airborne wireless standards such as Aircraft Communications Addressing and Reporting System (ACARS) or Satcom. The communication unit 102 operates independent of LAN protocols and supports representative functionality, such as file server access from aircraft terminals, terminal emulation sessions to a ground-based host, file transfers, Internet access, and Internet routing functions.

The communication unit 102 and/or the engine control 122 can manage credentials and user authentication to limit access to the memory system 212 of the engine control 122. User authentication can be defined for particular users or classes of users, such as equipment-owner users, maintenance technicians, engineering users, and the like. For example, a maintenance technician may have the authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the communication unit 102 can block access of the offboard systems 106 from reading from or writing to the memory system 212.

Configuration items received for the engine control 122 and/or the communication unit 102 may be encrypted using various cryptographic methods to further enhance security. For example, the communication unit 102 can apply a cryptographic algorithm using one or more parameters received and cryptographic information to decrypt an encrypted configuration item. A combination of transmitted and stored cryptographic information can be used together for decryption based on 'shared secrets' such that not all of the information is sent from the offboard systems 106 nor stored completely within the communication unit 102. After decryption, the authenticity of the configuration item can be verified using, for example, a digital signature of the configuration item. The resulting file can be a decrypted and authenticated configuration item, which may be temporarily stored in memory system 222 or memory system 212 otherwise buffered during authentication and passed to the engine control 122 upon authentication. According to one or more embodiments, the engine control can also perform its own decryption and authentication.

Separating the communication unit 102 from the engine control 122 can provide for the communication unit 102 and the engine control 122 to have different expected service life durations. For example, to stay compatible with changes in wireless communication technologies used by the offboard systems 106, the communication unit 102 may be upgraded at a faster interval than the engine control 122. The communication unit 102 can have a lower processing and storage capacity than the engine control 122 to reduce power requirements, weight, and other costs associated with the communication unit 102. Since the communication unit 102 does not actively control the gas turbine engine 104, development cycles may be reduced as compared to implementing flight-critical control algorithms and hardware of the engine control 122.

Further, separating the communication unit 102 from the engine control 122 provides for the engine control 122 to communicate with the offboard systems 106 via existing communications infrastructure available on the aircraft 108. For example, the communication unit 102 can be an existing communication unit 102, such as used to provide passenger WiFi, infotainment, cockpit maps, avionics software updates, etc., on the aircraft. Thus, the engine control 122 can utilize the existing communications infrastructure to transmit engine data to the offboard systems 106 and/or to receive software updates, trim updates, etc., from the offboard systems 106. To do this, the engine control 122 or the offboard systems 106 associates a header with data transmitted between the engine control 122 and the offboard systems 106. According to an example, the header is associated with the engine data by creating a packet that includes the engine data and uses the header as a packet header (e.g., the packet header portion of an Internet Protocol (IP) packet). In some cases, depending on the amount/size of engine data, the engine control 122 may divide the engine data into multiple packets, each of the multiple packets having the header. The communication unit 102 does not process and/or execute a control based on the body of the content of the message.

The header provides a unique identifier that identifies a source of the transmission and a destination for the transmission. That is, the header contains addressing information and other data used to deliver the engine data associated with the header to its intended destination (e.g., the offboard systems 106). As one example, the header defines comprises a source system identifier, a delivery destination identifier, and a report identifier. The source system identifier identifies the source of the transmission (e.g., a unique identifier associated with a particular aircraft system like a particular engine serial number on a particular aircraft with a particular engine control 122). The delivery destination identifier identifies a destination to receive the transmission (e.g., a unique identifier associated with a particular airline system such as the ground station 124 or an engine offboard system 106). The report identifier defines a type of report to which the data relate. The type of report can be associated with a segment of a flight plan. For example, a report about a takeoff event is identified with a takeoff identifier, a report about a landing event is identified with a landing identifier, a report about a climb event is identified with a climb identifier, etc.

Figure 3:
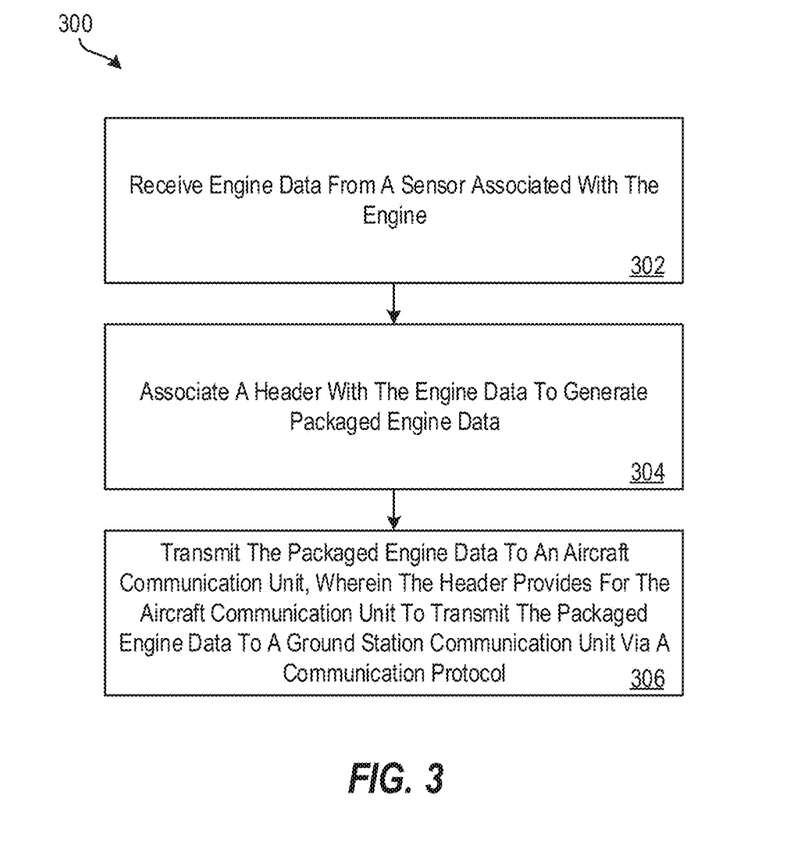
FIG. 3 is a flow chart illustrating a method according to one or more embodiments described herein.

Referring now to FIG. 3 with continued reference to FIGS. 1 and 2, FIG. 3 is a flow chart illustrating a method 300 for using the communication unit 102 and the engine control 122 of FIG. 2A according to one or more embodiments described herein. The method 300 may be performed, for example, by the engine control 122 of FIG. 2A and at least one of the offboard systems 106 of FIG. 2A.

At block 302, the engine control 122 receives engine data (e.g., one or more of the sensed values 208) from a sensor (e.g., one or more of the sensors 206) associated with the engine (e.g., the gas turbine engine 104).

At block 304, the engine control 122 associates a header with the engine data to generate packaged engine data. For example, the header is associated with the engine data by creating a packet that includes the engine data and uses the header as a packet header. It examples, the header includes a source system identifier, a delivery destination identifier, and a report identifier. The report identifier defines a type of report to which the engine data relates, for example, and the report type can be based on a segment of a flight plan (e.g., take off, climb, cruise, landing, taxi, etc.).

At block 306, the engine control 122 transmits the packaged engine data to an aircraft communication unit (e.g., the communication unit 102). The header provides for the aircraft communication unit to transmit the packaged engine data to a ground station communication unit (e.g., the ground stations 106) via a communication protocol. The header also provides for the ground station communication unit to transmit the packaged engine data to a delivery destination system (e.g., to an airline, to an engine original equipment manufacturer, to an airframer, etc.). According to one or more embodiments described herein, the aircraft communication unit is a terminal wireless local area network (LAN) unit (TWLU), and the ground station communication unit is a ground station TWLU. The communication protocol can be a cellular communication protocol, a WiFi communication protocol (for example, as defined by IEEE 802.11), a satellite communication protocol, or any other suitable wireless communication protocol, including combinations thereof.

While the above description has described the flow process of FIG. 3 in a particular order, it should be appreciated that unless otherwise specifically required in the attached claims that the ordering of the steps may be varied.

Figure 4:
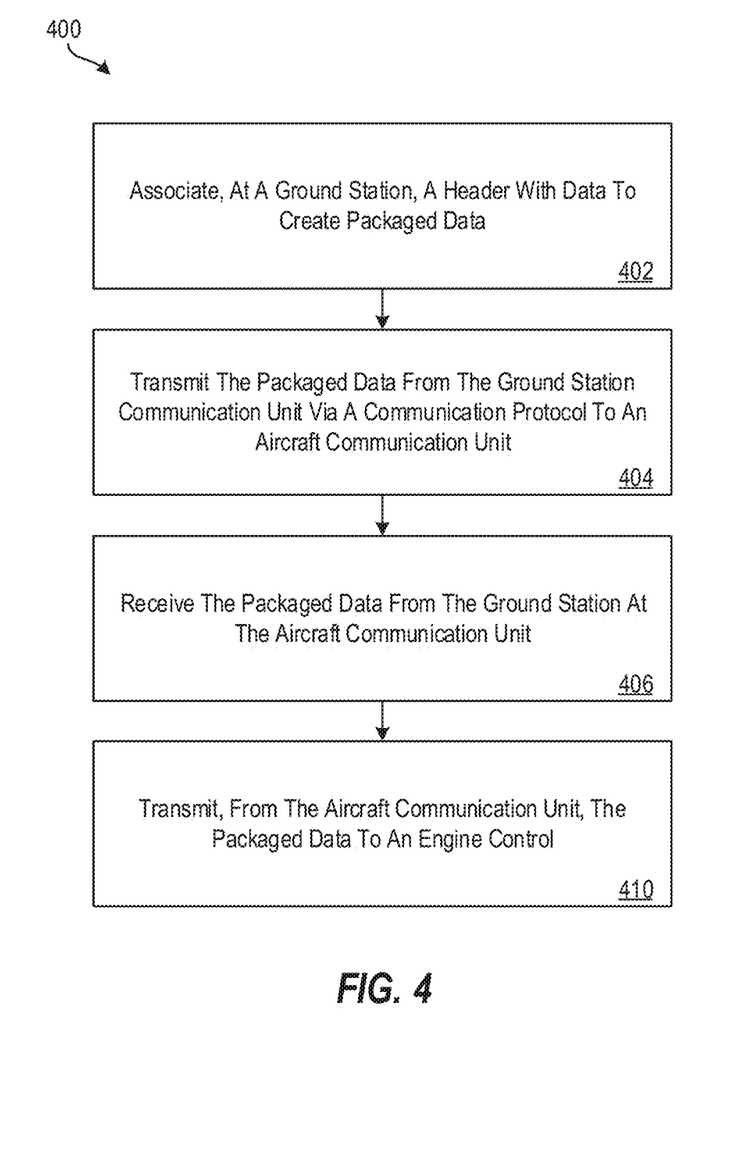
FIG. 4 is a flow chart illustrating a method according to one or more embodiments described herein.

FIG. 4 is a flow chart illustrating a method 400 for using the communication unit 102 and the engine control 122 of FIG. 2A according to one or more embodiments described herein. The method 400 may be performed, for example, by the engine control 122 of FIG. 2A and at least one of the offboard systems 106 of FIG. 2A.

At block 402, data (such as software, trims, configuration information to support upgrades of the gas turbine engine 104) is associated with a header at one or more of the ground systems 106 to create packaged data. At block 404, the packaged data is transmitted from the one or more of the ground systems 106 to the communication unit 102 via a communication protocol as described herein. At block 406, the packaged data from the one or more of the ground systems 106 is received at the communication unit 102. At block 408, the communication unit 102 transmits the packaged data to the engine control 122.

While the above description has described the flow process of FIG. 4 in a particular order, it should be appreciated that unless otherwise specifically required in the attached claims that the ordering of the steps may be varied.

An advantage of the techniques described herein includes uploading data to the engine control 122 to load software, trims, configuration information to support upgrades of the gas turbine engine 104, etc. Another advantage is that the present techniques support local maintenance work at the gas turbine engine 104 to support real-time troubleshooting, engine ground power assurance tests, and functional checkout of engine component changes. A further advantage is that using the engine control 122 using the communication unit 102 of the aircraft 108 eliminates the need for having wireless communication on the gas turbine engine 104 and leverages existing communication infrastructure on the aircraft 108.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
   monitoring and controlling operation of a gas turbine engine in real-time using an engine control mounted to a fan case;
   receiving, by the engine control, engine data from a sensor associated with the engine;
   generating a digitally electronic packet by the engine control, the digitally electronic packet including a header that is associated with the engine data to generate packaged engine data;
   transmitting, by the engine control, the packaged engine data to an aircraft communication unit, wherein the header provides for the aircraft communication unit to transmit the packaged engine data to a ground station communication unit via a communication protocol; and
   receiving, by the engine control, packaged engine data from the aircraft communication unit, wherein the header provides for the ground station to transmit the packaged engine data to the engine control via the communication protocol,
   wherein control of the gas turbine engine is controlled is based on at least one of the packaged engine data transmitted to the ground station and the packaged engine data received from the ground station.

2. The method of claim 1, wherein the header comprises a source system identifier, a delivery destination identifier, and a report identifier.

3. The method of claim 2, wherein the report identifier defines a type of report to which the engine data relates.

4. The method of claim 3, wherein the type of report is based on a segment of a flight plan.

5. The method of claim 1, wherein the aircraft communication unit is a terminal wireless local area network (LAN) unit (TWLU), and wherein the ground station communication unit is a ground station wireless terminal.

6. The method of claim 1, wherein the communication protocol is a cellular communication protocol.

7. The method of claim 1, wherein the communication protocol is a WiFi communication protocol.

8. The method of claim 1, wherein the communication protocol is a satellite communication protocol.

9. The method of claim 1, wherein the header provides for the ground station communication unit to transmit the packaged engine data to a delivery destination system.

10. A gas turbine engine comprising:
    a fan section comprising a fan case; and
    an engine control mounted on the fan case, the engine control configured to monitor and control operation of the gas turbine engine in real-time, the engine control comprising processing circuitry to:
    receive engine data about the gas turbine engine from a sensor associated with the gas turbine engine;
    generating a digitally electronic packet which includes a header that is associated with the engine data to generate packaged engine data;
    transmit the packaged engine data to an aircraft communication unit, wherein the header provides for the aircraft communication unit to transmit the packaged engine data to a ground station communication unit via a communication protocol;
    receive, by the engine control, packaged engine data from the aircraft communication unit, wherein the header provides for the ground station to transmit the packaged engine data to the engine control via the communication protocol,
    wherein control of the gas turbine engine is controlled is based on at least one of the packaged engine data transmitted to the ground station and the packaged engine data received from the ground station.

11. The gas turbine engine of claim 10, wherein the header comprises a source system identifier, a delivery destination identifier, and a report identifier.

12. The gas turbine engine of claim 11, wherein the report identifier defines a type of report to which the engine data relates.

13. The gas turbine engine of claim 12, wherein the type of report is based on a segment of a flight plan.

14. The gas turbine engine of claim 10, wherein the communication protocol is a cellular communication protocol.

15. The gas turbine engine of claim 10, wherein the communication protocol is a WiFi communication protocol.

16. The gas turbine engine of claim 10, wherein the communication protocol is a satellite communication protocol.

17. The gas turbine engine of claim 10, wherein the header provides for the ground station communication unit to transmit the packaged engine data to a delivery destination system.

18. An aircraft comprising:
a gas turbine engine comprising:
a fan section comprising a fan case; and
an engine control mounted on the fan case, the engine control configured to monitor and control operation of the gas turbine engine in real-time, the engine control comprising first processing circuitry to:
receive, by the engine control, engine data about the gas turbine engine from a sensor associated with the gas turbine engine; and
generate, by the engine control, a digitally electronic packet which includes a header that is associated with the engine data to generate packaged engine data; and
a communication unit comprising second processing circuitry configured to:
receive the packaged engine data from the engine control;
transmit the packaged engine data to a ground station communication unit via a communication protocol based at least in part on the header; and
receive, by the engine control, packaged engine data from the aircraft communication unit, wherein the header provides for the ground station to transmit the packaged engine data to the engine control via the communication protocol,
wherein control of the gas turbine engine is controlled is based on at least one of the packaged engine data transmitted to the ground station and the packaged engine data received from the ground station.

19. The aircraft of claim 18, wherein the header comprises a source system identifier, a delivery destination identifier, and a report identifier, wherein the report identifier defines a type of report to which the engine data relates, and wherein the type of report is based on a segment of a flight plan.

20. The aircraft of claim 18, wherein the communication protocol is one of a cellular communication protocol, a WiFi communication protocol, or a satellite communication protocol.

* * * * *